(12) United States Patent
Langhorn et al.

(10) Patent No.: US 7,199,499 B2
(45) Date of Patent: Apr. 3, 2007

(54) HOMOPOLAR MACHINE WITH BRUSH IMPROVEMENT

(75) Inventors: Alan R. Langhorn, Solana Beach, CA (US); Zbigniew S. Piec, San Diego, CA (US)

(73) Assignee: General Atomics, San Diego, CA (US)

( * ) Notice: Subject to any disclaimer, the term of this patent is extended or adjusted under 35 U.S.C. 154(b) by 0 days.

(21) Appl. No.: 11/150,502

(22) Filed: Jun. 9, 2005

(65) Prior Publication Data

US 2006/0279163 A1    Dec. 14, 2006

(51) Int. Cl.
*H02K 13/00* (2006.01)
(52) U.S. Cl. ......................... 310/251; 310/45
(58) Field of Classification Search ................ 310/42, 310/45, 248, 251, 252
See application file for complete search history.

(56) References Cited

U.S. PATENT DOCUMENTS

| | | | |
|---|---|---|---|
| 1,396,948 A * | 11/1921 | Cooley | 310/248 |
| 3,648,088 A | 3/1972 | Wilkin et al. | |
| 4,246,507 A | 1/1981 | Weldon et al. | |
| 4,358,699 A | 11/1982 | Wilsdorf | |
| 4,398,113 A | 8/1983 | Lewis et al. | |
| 4,415,635 A * | 11/1983 | Wilsdorf et al. | 428/611 |
| 4,443,726 A * | 4/1984 | Ikegami et al. | 310/248 |
| 4,698,540 A | 10/1987 | McKee | |
| 4,710,665 A | 12/1987 | Kilgore et al. | |
| 5,138,212 A | 8/1992 | Wong et al. | |
| 5,844,345 A | 12/1998 | Hsu | |
| 6,245,440 B1 | 6/2001 | Kuhlmann-Wilsdorf et al. | |
| 6,873,078 B1 | 3/2005 | Piec et al. | |
| 2001/0024735 A1 | 9/2001 | Kuhlmann-Wilsdorf et al. | |
| 2002/0060506 A1 | 5/2002 | Kuhlmann-Wilsdorf | |

\* cited by examiner

*Primary Examiner*—Thanh Lam
(74) *Attorney, Agent, or Firm*—Fitch, Even, Tabin & Flannery

(57) ABSTRACT

The wear life of flexible copper fiber brushes when used at a positive pole in a direct current motor or generator is improved by the provision of an effective amount of zinc as a sacrificial anode material. Flame-sprayed zinc is applied as a coating to the exterior surface of such a copper fiber pack to bond the fibers with a surrounding metal wire reinforcing wrap, of cross wound copper wire or fine mesh, woven copper wire screen material, and create an improved brush.

17 Claims, 1 Drawing Sheet

HOMOPOLAR MACHINE WITH BRUSH IMPROVEMENT

This invention was made with Government support under Contract No. N00014-00-C-0531 awarded by the Office of Naval Research. The Government has certain rights in this invention.

FIELD OF THE INVENTION

The present invention relates to direct current machines, and more specifically to homopolar machines and brushes used therein.

BACKGROUND OF THE INVENTION

Homopolar machines are operated by direct current (DC) and are simple in design principle. They have been under consideration and development for some years for use in ship propulsion applications because of their high efficiency, compact size, low weight, and reduced acoustic signature relative to all other motors, see U.S. Pat. No. 3,657,580 (1972).

A homopolar machine includes four major components: armature, stator, field coils, and flux return. The armature is connected to the machine's shaft and is often referred to as the rotor. The armature typically includes a series of concentric, copper cylinders and is free to rotate in a direction at right angles to the magnetic field lines produced by the field coils. When a voltage is applied across the armature in the direction of the shaft, electric current flows parallel to the shaft. The current and magnetic field interaction (I×B) results in torque generation and rotation, thus producing a motor. In contrast, if the armature is driven externally as a generator application, the interaction of the armature rotating at right angles to the magnetic field lines generates a voltage and electric current.

In both the motor and generator scenarios, current flows along the armature and to the stationary stator via sliding electrical contacts referred to herein as current collectors or brushes, which may take various forms and be made of various materials. Such materials include but are not limited to flexible fibrous copper and flexible copper strips; flexible copper fibers are perhaps most commonly used in DC motors.

The field coils are typically circumferentially continuous in geometry and aligned on the same central axis with respect to each other. A homopolar machine always cuts (or crosses as it rotates) magnetic flux lines of a magnetic field in the same direction due to the interacting armature and shaft iron being aligned on the same axis. This means that any point on the rotor always sees the same magnetic field as it rotates, and no differences in magnetic flux or multiple magnetic poles are encountered by conductive elements of the armature as it rotates. Hence the nomenclature "homopolar machine".

The flux return typically includes a highly magnetically permeable material, such as iron or steel. The flux return is designed primarily to limit the undesirable stray magnetic field that radiates from the machine; therefore, it typically takes the form of a structural housing that surrounds the motor. In addition, the flux return may also be designed to help direct the magnetic field lines produced by the field coils into the armature interaction region to improve the machine's flux utilization.

Although conventional rotating machines are in wide use, brush wear has been a point of continuing concern, and one objection to homopolar machines is that they tend to often have lower reliability in comparison to standard DC motors. Because homopolar machines use current collectors, i.e. brushes, to transfer current between each rotating armature turn and each stationary stator turn, the value of homopolar machines is heavily dependent upon the reliability of such current collectors. Current collectors need to maintain uniform contact pressure with the armature, usually along slip rings, and performance is often measured in terms of current collector wear and current-carrying capability. Maintaining an ideal contact pressure and minimizing wear in a homopolar machine is the subject of U.S. Pat. No. 6,873,078, where homopolar machines are disclosed having where mechanisms that help to maintain ideal contact pressure and where it is taught that, in a homopolar motor, it has been found that the positive polarity (anode) brushes wear at a rate ten times higher than the negative (cathode) brushes. It is thus stressed that lifetime can be improved by polarizing all brushes negative.

Furthermore, the magnetic field that is inherent in homopolar and other motor concepts causes slip ring voltage gradients that induce high circulating currents in the brush. As a consequence, during motor operation, the circulating and transfer currents interact with the magnetic field resulting in substantial electromagnetic forces on the brush. Unless properly restrained, these forces can cause the brush to distort to the point where it is no longer functional.

Thus, the search has continued for better solutions to such problems.

SUMMARY OF THE INVENTION

Such accelerated brush wear rate is postulated to be due to electron bombardment/ionization of the positive brush fibers resulting in corrosion at the brush/slip ring interface. As the anode brush supplies current, it gradually dissolves into ions in an electrolyte (dissociated water) and at the same time produces electrons. In the case of the anode brush, the ion activation energy is lower because of the electric field direction; such is diagrammatically depicted in FIG. 1. The result is an increased level of ions formed under the anode. The ions react with $O_2$ and OH which are oxidizing agents from dissociated water. The result is one of increased metal oxide formation under the anode brush and increased wear rate with respect to the negative (cathode) brush; however, the ionization and oxidation process can be reduced by supplying an excessive amount of electrons from the anode to the cathode, thus reducing ionization. This, in turn, reduces the level of chemical reaction that is causing oxidation at the brush/slip ring interface.

It has now been found that homopolar motor metallic brushes can be further protected against such ionization and oxidation by providing zinc as a sacrificial anode material at the anode, for example by flame spray coating copper fiber brushes with zinc or the equivalent. Zinc, in this situation, supplies electrons, and the supply of electrons from zinc is a factor of three higher than from copper, thus protecting the copper fibers.

In one particular aspect, the invention provides an electrical brush for use with a direct current motor or generator, which brush comprises a pack containing a plurality of flexible copper fibers having distal ends for contact with a slip ring, a wrap surrounding said pack of fibers, which wrap will wear along with said flexible fibers, and an amount of zinc (Zn) on the exterior of and/or within said copper fiber pack so that, when the brush is used at a positive pole in a motor or generator, said brush demonstrates increased resistance to oxidation and exhibits substantially reduced wear as a result of suppressing ionization in the general region where there is contact between brush and slip ring and thus results in longer operational brush life.

In another particular aspect, the invention provides a homopolar machine which includes an armature, a stator, field coils, flux return and a plurality of brushes at positive poles of the homopolar machine, wherein each of the brushes comprises a pack containing a plurality of flexible copper fibers having distal ends in contact with a slip ring of the armature, a wrap surrounding said pack of fibers, which wrap will wear along with said flexible fibers, and an amount of zinc (Zn) on the exterior of and/or within said copper fiber pack so that said brush demonstrates an increased resistance to oxidation and exhibits substantially reduced wear as a result of suppressing ionization in the general region where there is contact between brush and slip ring, at a positive pole in a motor or generator, resulting in longer operational life.

In a further particular aspect, the invention provides a method of making an electrical brush for use with a direct current motor or generator, which method comprises providing a pack of a plurality of flexible copper fibers, laterally surrounding said pack of fibers with a flexible wrap that will wear along with said flexible fibers, and providing an amount of zinc (Zn) on the exterior of and/or within said copper fiber pack so that said brush demonstrates an increased resistance to oxidation as a result of suppressing ionization in the general region where there is contact between distal ends of the brush and a slip ring of the homopolar machine, as a result of which the brush experiences substantially reduced wear and longer operational life.

DESCRIPTION OF THE PREFERRED EMBODIMENTS

Figure 1:
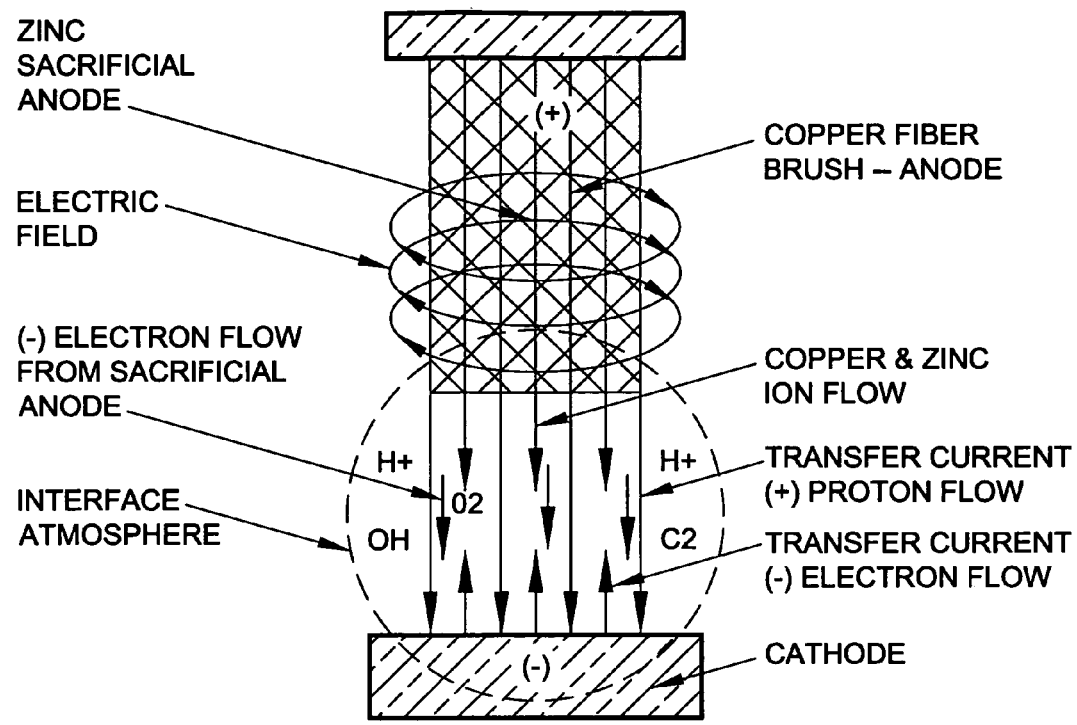
FIG. 1 is a schematic view showing the brush wear suppression mechanism that is a feature of the present invention.
Figure 2:
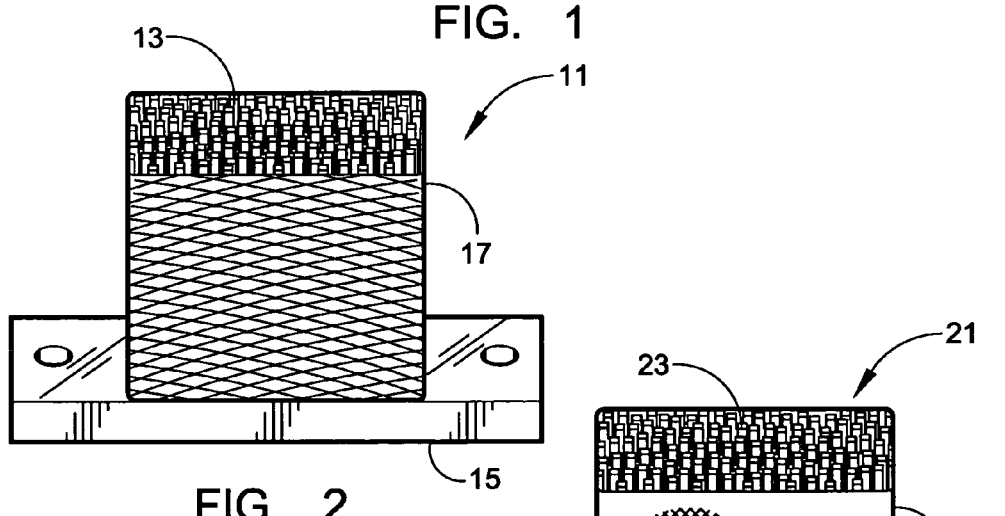
FIG. 2 is a perspective view showing a copper fiber brush with a reinforcing wrap of windings of copper wire before it has been flame-sprayed with zinc.

Electrical brushes for use in homopolar machines are commonly made of copper fiber stock arranged in parallel relationship to one another to form a pack. One embodiment of such a brush 11 is illustrated in FIG. 2; copper fibers 13 extend from a base 15. Generally the copper fibers 13 are not greater than about 0.2 mm in diameter, and frequently they will have diameters within a range of about 25 microns to 100 microns. The fibers 13 will usually have a length of at least about 15 mm and will normally extend from the base 15 through the major portion of the length of the brush pack and frequently for the entire length thereof. The distal ends of the copper fibers 13 contact the moving cylindrical surface, usually a slip ring, of the rotor requiring the fibers to be of a flexible nature. The brush 11 will normally be part of a holder, such as that disclosed for example in the aforementioned '078 patent, which will maintain it in contact with the slip ring at a desired substantially constant pressure.

To stabilize the fiber brush pack, it is reinforced with an external cross-wrap or sleeve 17, which serves to unite the multitude of parallel, flexible fibers 13 so that they will function as a unitary structure. Various types of cross-wrapping may be employed, including braiding, and fine metal wire is preferred for the cross-wrap 17. For example, as shown in FIG. 2, fine copper wire may be wrapped back and forth about the pack of copper fibers 13 at an angle of between about 20° and 45° to the distal wear surface of the brush, i.e. at an angle between about 70° and 45° to the longitudinal axis of the copper fibers themselves. The winding or wrapping of the wire crosses over itself so as to provide an effective outer containment sleeve. The wire is chosen so that it will wear along with the distal ends of the copper fibers 13 themselves, and accordingly, the wire should be flexible. Copper wire is preferred, and, for example, fine copper wire may be used having a diameter between about 0.04 mm and about 0.08 mm.

It is important that the outer wrap or sleeve 17 be bonded to the exterior of the fiber pack so that it does not loosen as the brush fibers 13 flex under electromagnetic load. It has been found that, although various bonding techniques as known in this art may be used to unite these outer wrappings to the exterior surface of a brush pack, a dual purpose can be achieved by employing the sacrificial anode material to also serve as a bonding material.

It has been found that flame-sprayed zinc applied using commercially available flame-spray guns can effectively be used to bond the metal wire wrapping 17 to the fiber brush pack and provide the desired amount of sacrificial anode material. In the flame-spray process, zinc is fed, usually in wire form, into a chamber where it is heated above its melting point and then sprayed out a nozzle under pressure of air or inert gas as minute droplets of molten zinc. The layer thickness can be carefully controlled as a result of the feed rate of the metal into the combustion chamber and the motion of the spray head. The flame-spraying of the zinc is preferably carried out subsequent to winding of the metal wire around the brush fiber pack. If desired, the individual wraps of wire may not be arranged as tightly to facilitate some intrusion of the molten zinc being sprayed. Zinc has been shown to adhere well to the copper fibers and to copper wire, and it thus also serves as a good bonding agent to enhance the outer reinforcement that the wire-wound wrap or sleeve gives to the copper fiber brush pack.

To have the desired amount of wear suppression effect, it is considered that zinc should be present in the region of general contact between the distal end of the copper fibers 13 and the cathode of the slip ring in an amount of at least about 0.15 gram per cc. and preferably at least about 0.2 gram per cc. This can be provided by coating with a thickness of about 5 mil to about 10 mil (about 0.13 mm to about 0.25 mm) of zinc during the flame-spraying process. Thicker coatings are in no way detrimental and may afford more reinforcement.

Alternative ways of providing the zinc sacrificial anode material are by using copper fibers having an exterior coating of zinc, or by using a mix of copper fibers and zinc fibers. In either such instance, there should be a sufficient amount of zinc present to serve its sacrificial anode function. Another alternative manner is to wind the cross-wrap using copper wire carrying a substantial layer of zinc as an outer coating. Then, subsequent to wrapping, the zinc is optionally used as the bonding material by heating the wire-wrapped brush 11 above the melting point of zinc so it would bond to the outermost layer of copper fibers 13 in the pack.

To demonstrate the effectiveness of the operation of zinc as a sacrificial anode, prototype brushes are manufactured using copper fibers about 20 mm in length and having a diameter of about 50 microns. They are united in packs to form brushes about 10 mm thick and about 20 mm wide. These brush packs are cross-wrapped with copper wire having a diameter of about 0.05 mm at an angle of about 30°. Some of these brushes have the copper wire bonded to the exterior surface of the flexible copper fibers using a standard bonding agent such as varnish. Other identical wire-wrapped fiber packs are bonded by applying a layer of flame sprayed zinc about 6 to 9 mils thick about the entire exterior of the fiber brush pack to complete the brushes. Both sets of brushes are supported in similar brush holders and maintained in constant contact with a rotating slip ring with the same pressure through the use of actuators as well known in the art. Operation using the identically wrapped brushes with and without the zinc sacrificial anode material is continued for a period of time. Test results demonstrate that the brushes which carry the flame-sprayed zinc coating experience an amount of wear only about 40% of the wear experienced by the other brushes.

Figure 3:
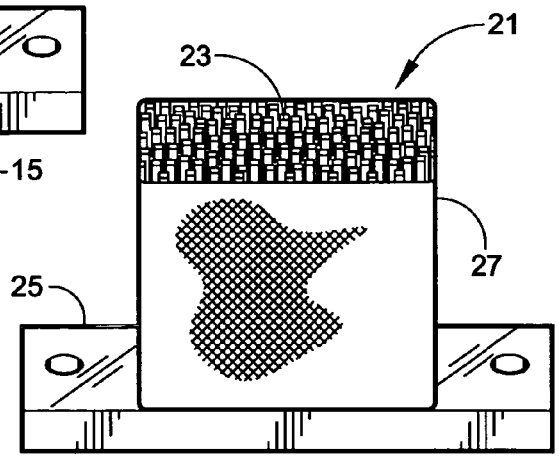
FIG. 3 is a perspective view showing a copper fiber brush with a reinforcing wrap of a sleeve of woven copper wire before it has been flame-sprayed with zinc.

Illustrated in FIG. 3 is an alternative embodiment of a brush 21 which is constructed with a pack of copper fibers 23 and a base 25 similar to that described with respect to the FIG. 2 embodiment. A cross-wrap or sleeve 27 laterally surrounds the brush pack in the form of a woven metal wire material similar to wire screening. The sleeve 27 is preferably made of fine copper wire of a diameter between about 50 μm and about 75 μm. For example, it might be a U.S. standard screen size of 200 or higher that would be made with copper wire of about 53 μm diameter. This fine mesh woven wire screen material can be formed as a sleeve 27 to fit around the exterior surface of the brush pack, or it can be simply wrapped around the brush pack and the ends suitably secured to each other. Although as previously mentioned, the zinc coating might be applied to the woven wire material prior to its association with the brush pack, it is preferably installed as uncoated copper wire screen material and subjected to flame spraying with zinc as described hereinbefore. Such a woven wire mesh sleeve 27 with the zinc sacrificial anode material effectively unites the copper fibers, and as an effective brush pack wears, it is foreshortened along with the individual brush fibers. It supplies electrons during operation and thus very substantially improves brush wear.

While the invention has been described with respect to the best mode presently known to the inventors for carrying out the invention, it should be understood that changes and modifications as would be obvious to one having ordinary skill in this art may be made without departing from the scope of the invention which is set forth in the claims. For example, although elemental zinc is the preferred sacrificial anode material, equivalents to zinc that will function in essentially the same manner may be alternatively employed. The disclosures of all of the U.S. patents mentioned are herein expressly incorporated by reference. Particular features of the invention are emphasized in the claims which follow.

The invention claimed is:

1. An electrical brush for use with a direct current motor or generator, which brush comprises:
    a pack containing a plurality of flexible copper fibers having distal ends for contact with a slip ring,
    a flexible wrap surrounding said pack of flexible copper fibers, which wrap will wear along with said flexible fibers while said copper fibers can flex therewithin, and
    an effective amount of zinc (Zn) on the exterior of and/or within said copper fiber pack so that, when the brush is used at a positive pole in a motor or generator, said brush demonstrates increased resistance to oxidation and exhibits substantially reduced wear as a result of suppressing ionization in the general region where there is contact between said flexible fibers of said brush and the slip ring and thus results in longer operational brush life.

2. The brush according to claim 1 wherein said pack is wrapped with metal wire at an angle of between about 45 and about 20 degrees to the distal wear surface of the brush to provide said wrap.

3. The brush according to claim 2 wherein said metal wire is copper wire.

4. The brush according to claim 3 wherein said metal wire wrapping is bonded to the exterior surface of said pack.

5. The brush according to claim 3 wherein a coating of flame-sprayed Zn is present on the exterior of said wrapped pack of copper fibers.

6. The brush according to claim 1 wherein said pack is laterally surrounded with flexible woven metal wire material as said wrap.

7. The brush according to claim 6 wherein said metal wire is copper wire.

8. The brush according to claim 7 wherein said copper wire has a diameter of between about 50 μm and about 75 μm.

9. The brush according to claim 7 wherein said flexible metal wire wrap is bonded to said flexible copper fibers at the exterior peripheral surface of said pack of flexible copper fibers.

10. The brush according to claim 7 wherein a coating of flame-sprayed Zn is present on the exterior surface of said wrapped pack of flexible copper fibers.

11. The brush according to claim 1 wherein each of said flexible copper fibers is coated with Zn.

12. The brush according to claim 1 wherein Zn fibers are interspersed among the flexible copper fibers.

13. The brush according to claim 1 wherein Zn is present in at least about 0.15 gram per cc. of active brush region that might be expected to contact the slip ring during brush lifetime.

14. For use with a homopolar machine which includes an armature, a stator, field coils, and flux return, a plurality of brushes for disposition at positive poles of the homopolar machine, wherein each of which brushes comprises:
    a pack containing a plurality of flexible copper fibers having distal ends which would contact a slip ring of the armature,
    a flexible metal wrap surrounding said pack of flexible copper fibers, which wrap will wear along with said flexible fibers, and
    an effective amount of zinc (Zn) on the exterior of and/or within said copper fiber pack so that said brush demonstrates an increased resistance to oxidation and exhibits substantially reduced wear as a result of suppressing ionization in the general region where there is contact between said flexible copper fibers of said brush and the slip ring, at a positive pole in a motor or generator, resulting in longer operational life.

15. The invention according to claim 14, wherein said pack is wrapped with metal wire at an angle of between about 45 and about 20 degrees to the distal wear surface of the brush to provide said wrap.

16. The invention according to claim 14, wherein said pack is laterally surrounded with flexible woven metal wire material as said wrap.

17. An electrical brush for use at a positive pole in a direct current motor or generator, which brush comprises:

a pack containing a plurality of flexible copper fibers having distal ends for contact with a slip ring, a wrap surrounding said pack of fibers, which wrap will wear along with said flexible fibers, and zinc (Zn) on the exterior of and/or within said copper fiber pack in an amount of at least about 0.15 gram per cc.

of active brush region that might be expected to contact the slip ring during brush lifetime, so that said brush demonstrates increased resistance to oxidation and exhibits substantially reduced wear as a result of suppressing ionization in the general region where there is contact between brush and slip ring at the positive pole and thus results in longer operational brush life.

\* \* \* \* \*